United States Patent
Ebert et al.

(10) Patent No.: US 12,053,923 B2
(45) Date of Patent: Aug. 6, 2024

(54) DEVICE FOR LAYER-WISE CONSTRUCTION OF A SHAPED BODY BY STEREOLITHOGRAPHIC SOLIDIFICATION OF PHOTOPOLYMERIZABLE MATERIAL

(71) Applicant: Ivoclar Vivadent AG, Schaan (LI)

(72) Inventors: Jörg Ebert, Buchs (CH); Stefan Geissbühler, Langenthal (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/172,502

(22) Filed: Feb. 22, 2023

(65) Prior Publication Data

US 2023/0191692 A1    Jun. 22, 2023

Related U.S. Application Data

(62) Division of application No. 16/539,275, filed on Aug. 13, 2019, now Pat. No. 11,607,840.

(30) Foreign Application Priority Data

Aug. 24, 2018 (EP) .................................. 18190700

(51) Int. Cl.
| | |
|---|---|
| *B29C 64/135* | (2017.01) |
| *B29C 64/277* | (2017.01) |
| *B29C 64/282* | (2017.01) |
| *B29C 64/286* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/135* (2017.08); *B29C 64/277* (2017.08); *B29C 64/282* (2017.08); *B29C 64/286* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/129; B29C 64/135; B29C 64/277; B29C 64/393; B29C 64/264; B29C 64/268; B29C 64/273; B29C 64/282; B29C 64/286; B29C 64/291; B29C 71/04; B29C 64/386; B33Y 10/00; B33Y 30/00; B33Y 50/02; H04N 1/4015
See application file for complete search history.

(56) References Cited

U.S. PATENT DOCUMENTS

| | | |
|---|---|---|
| 6,483,596 B1 | 11/2002 | Philippi et al. |
| 7,683,857 B2 | 3/2010 | Yoshida |
| 9,067,359 B2 | 6/2015 | Rohner et al. |
| 2001/0048184 A1 | 12/2001 | Ueno |
| 2010/0249979 A1 | 9/2010 | John et al. |
| 2015/0002750 A1 | 1/2015 | Toyooka |
| 2017/0157862 A1 | 6/2017 | Bauer |
| 2017/0246797 A1 | 8/2017 | Lambrecht et al. |
| 2018/0126647 A1 | 5/2018 | Schultheiss |

FOREIGN PATENT DOCUMENTS

WO        96/00422 A1    1/1996

*Primary Examiner* — Philip C Tucker
*Assistant Examiner* — Jimmy R Smith, Jr.
(74) *Attorney, Agent, or Firm* — Ann M. Knab; Thad McMurray

(57) ABSTRACT

The present invention relates to a method and device for layer-wise instruction of a shaped body by stereolithography in subsequent layers.

7 Claims, 2 Drawing Sheets

FIG. 2

DEVICE FOR LAYER-WISE CONSTRUCTION OF A SHAPED BODY BY STEREOLITHOGRAPHIC SOLIDIFICATION OF PHOTOPOLYMERIZABLE MATERIAL

CROSS-REFERENCE TO RELATED APPLICATIONS

This application is a divisional application and claims priority to U.S. application Ser. No. 16/539,275, filed on Aug. 13, 2019, which claims priority to European patent application No. 18190700.7 filed on Aug. 24, 2018, the disclosures of which are incorporated herein by reference in their entirety.

TECHNICAL FIELD

The present invention is directed to a method for layer-wise construction of a shaped body by stereolithographic solidification of photopolymerizable material in successive layers utilizing an exposure unit for exposure within an exposure area having a layer contour that is individually predefined for each layer, wherein the exposure unit is configured for exposing a plurality of picture elements in a predetermined exposure field and to perform an exposure by selectively, controlled by a control unit, exposing picture elements which collectively define the exposure area having the predefined layer contour for each respective layer, and wherein the exposure unit is configured to be controllable by the control unit to generate exposure light for each picture element with adjustable exposure intensity between zero and a maximal intensity, which exposure light is projected by imaging optics to an associated picture element, wherein the control unit uses, when controlling the exposure unit, homogenizing factors which have been determined in advance wherein each picture element is associated with a homogenizing factor which is determined in advance such that, when for the generation of exposure light exposure intensities are used which for each picture element are determined by a uniform basic intensity multiplied with the homogenizing factor that is associated with each respective picture element, the intensity that actually is effected for each picture element is the same for each picture element independent of the position in the exposure field.

BACKGROUND

A method for constructing a shaped body is for example known from WO 2010/045950 A1 and corresponding U.S. Pat. Nos. 8,623,264 and 9,067,359, both of which are hereby incorporated by reference in their entirety, which are particularly directed to the construction of dental restorations from ceramic slurries which comprise a liquid, photopolymerizable component. In this prior art method a construction platform is held vertically moveable over a tank bottom which is transparent. Underneath the tank bottom an exposure unit is located. The construction platform is first lowered into the slurry until between construction platform and tank bottom only a layer with the desired layer thickness remains. Then this layer is exposed by the exposure unit with a desired shape (one or more separate areas with defined outer contours) and thereby solidified. After lifting the construction platform up slurry is replenished from the surrounding area, and the construction platform is lowered again, wherein the lowering is controlled such that the distance between the last cured layer and the tank bottom defines a layer with the desired thickness. The last steps are repeated until a shaped body with the desired three-dimensional shape has been built up by the successive solidification of layers with respectively predefined contour.

The exposure unit is configured for exposing a large number of picture elements in a predetermined exposure field. The exposure unit comprises for example a light source and a spatial light modulator which has an active surface which is illuminated by the light source. The spatial light modulator comprises an array of exposure elements, wherein each exposure element is assigned to a picture element in the exposure field of the exposure unit. The spatial light modulator can for example be a so called micromirror device which is known to be a chip on which a large number of micromirror actuators are arranged in an array. Each micromirror actuator may individually and selectively be controlled under the control of a control unit to switch between an exposure position in which the respective micromirror directs light from the light source onto the associated picture element, and a dark position in which the micromirror deflects light of the light source to an inactive area such that the associated picture element in the exposure field does not receive light from the associated micromirror. By tilting the micromirror between the mentioned positions using a selectively predefined duty cycle for each micromirror the exposure intensity generated in this manner for the associated picture element can be set as average intensity by setting the duty cycle accordingly. Another example for a spatial light modulator comprises a liquid crystal display which is illuminated by a light source and which is subdivided into an array of a large number of individual exposure elements, each of which being associated with a picture element in the exposure field of the exposure unit.

The array of exposure elements of the exposure unit is projected onto the exposure field of the exposure unit by imaging objective lenses. The exposure field is divided into the large number of picture elements, and within the exposure field an exposure area can be exposed by activation of the exposure elements which are associated with the picture elements within the exposure area. For most exposure steps during construction of a typical shaped body the actually needed exposure area is substantially smaller than the entire exposure field which can in principle be illuminated by the exposure unit. In many cases rather central parts of the exposure field are illuminated as the exposure area.

The exposure intensity of each exposure element of the exposure unit is adjustable by a control unit as explained above such that the actually generated exposure intensity for each picture element can be set by controlling the associated exposure elements accordingly. It has to be taken into account that the optical elements between the light source and the exposure field of the exposure unit cause an intensity attenuation which is not the same for all picture elements in the exposure field of the exposure unit, but depends on the location within the exposure field. For common imaging optics the intensity attenuation is lowest in a central area of the exposure field, wherein the intensity attenuation is higher further away from the centre of the exposure field and is at a maximum at the outer edge of the exposure field. In other words, even if for all picture elements the same exposure intensity is generated by the associated exposure elements the described inhomogenieties of the imaging optics have the effect that the actually effective intensity at the associated picture elements is varying depending on the position over the exposure field. In this respect it is known to calibrate the exposure unit in advance and to determine a matrix of so called homogenizing factors, wherein each exposure element, and thus each picture element in the exposure field of the exposure unit, is associated with a homogenizing factor, i.e. with an element in a matrix of homogenizing factors. The homogenizing factors are determined such that when controlling the exposure elements with uniform basic intensity multiplied with the homogenizing factors the actually effected intensity is the same for all picture elements in the exposure field.

The homogenizing factors can for example be determined in advance by measuring the actually effective intensity for each picture element. For each picture element the ratio between the actually effective intensity for the respective picture element and the maximal intensity of a picture element in the exposure field, and this ratio can be assigned to the respective picture element. The homogenizing factors are determined as the inverse of the mentioned intensity ratios, and are assigned to the individual picture elements. This means that the picture elements having the maximal intensity in the exposure field have an assigned homogenizing factor 1, whereas a picture element which is typically closer to an edge of the exposure field and for which the actually effective intensity would be smaller due to the attenuation of the imaging optics has a homogenizing factor that is larger than 1 such the higher attenuation in the beam path caused by the imaging optics to the respective picture element is compensated for by the increased originally generated intensity of the associated exposure element which is increased by the homogenizing factor.

A method as described above for stereolithographic construction of bodies is known from WO 96/00422 A1 and corresponding U.S. Ser. No. 19/949,266910, which is hereby incorporated by reference. The method utilizes a spatial light modulator, designated as programmable mask in the document, comprising for example 640×480 exposure elements which are projected by an imaging optic onto an exposure area. In table 2A of the document the actually effective intensities in the picture elements are indicated for a simplified example of an exposure field having 11×11 picture elements, wherein the central picture element has an intensity of 100, and the intensities effective outside of the central area, in particular at the edges, are substantially lower. The minimum intensity in the corners of the 11×11 picture elements is 9. In table 2B the corresponding homogenizing factors (designated as scaling factors in the document) are listed, which scaling factors have a value of 1.0 in the center and values of 11.1 in the corners, and values inbetween for the remaining picture elements.

A disadvantage of the described stereolithographic method is that an exposure of an exposure area is homogenized in such a manner as if the entire exposure field of the exposure unit would be exposed, even if the actual exposure area only forms a small subarea of the exposure field. This is disadvantageous in particular for many building steps for layers which have a layer area rather limited to a central area within the exposure field or which at least do not extend to the picture elements at the outer edges of the exposure field. The exposure elements participating in exposures of such central exposure areas do not need or at least do not need a substantial amplification to effect homogenization of the central exposure area. However, since the exposure unit is controlled in such a manner that hypothetically a picture element at the edge could be exposed at the same time which would need a high amplification (large homogenizing factor), in order to hypothetically effect the same actually effective intensity at that point, the dynamic range of the exposure element for picture elements of a central exposure area is not exploited in an effective manner. This is due to the fact that the exposure elements associated with a central exposure area are operated at a relatively low amplification and therefore at a relatively low absolute intensity which is therefore in most cases significantly lower than the maximal intensity per exposure element. In such exposures in which exclusively or to a large extent only exposure elements are utilized which have a homogenizing factor which is not significantly larger than 1, the capacity of the exposure unit cannot be utilized effectively for such exposure areas. In other words, the light of the light source is not utilized effectively for such exposure areas since always the potential capacity is kept ready to be capable of exposing in principle also a picture element which has a very high homogenizing factor (edge picture element). In an exposure area with relatively low homogenizing factors this implies that for the picture elements the light of the light source is to a substantial extent not utilized for exposure but has to be deflected to an inactive area, when for example a micromirror device with pulse width modulation is used.

SUMMARY OF THE INVENTION

It is therefore an object of the present invention to improve a stereolithographic construction method for shaped bodies in such a manner that the performance capacity of the exposure unit is exploited more effectively.

This and other objects are achieved by the method comprising the features of the claims. A device for carrying out the method according to the invention is further defined in the claims.

In a stereolithographic construction method according to the invention provision is made for determining a brightening factor before exposing an exposure area, wherein the brightening factor is defined as the ratio between the maximal intensity of the exposure unit and the maximal intensity of an exposure element in the current exposure area. The exposure intensities of the picture elements in the exposure area are multiplied by the brightening factor, and after this scaling are used for controlling the exposure unit for exposing the current exposure area. In this manner it is ensured that during exposure of each exposure area that in this particular exposure area at least one exposure element is operated at the maximal intensity per exposure element of the exposure unit. This means that in particular for exposure areas which are located in the center of the exposure field of the exposure unit that the performance capacity of the exposure unit is exploited in a substantially more efficient manner.

A simplified schematic example of an exposure field comprising 4×3 picture elements is shown in FIG. 2. It is intended to expose the grey shaded square of four picture elements which contain a 1. The exposure elements of the exposure unit are controllable to have set intensity on an 8 bit scale between 0 and maximal intensity of 255 per exposure element. In the middle of FIG. 2 the matrix of homogenizing factors is shown. As it is usual for typical imaging optics the attenuation in the central area is lower than at the edges which means that at the edges higher homogenizing factors are present. The multiplication of the matrix on the left hand side having the uniform basic intensity 1 in the square to be exposed with the homogenizing factors results in the matrix of exposure intensities shown on the right hand side. As can be seen the maximal exposure intensity in an exposure element of the exposure area is 200; the maximal adjustable intensity of 255 per exposure element is therefore not efficiently made use of. For this reason a brightening factor is determined which is defined as the ratio between the maximal exposure intensity of 255 per exposure element and the maximal exposure intensity 200 present in the current exposure area: brightening factor=255/200. The exposure intensities used for controlling the exposure elements for this exposure area are multiplied with this brightening factor such that for this exposure area the exposure intensities shown in the matrix on the bottom right result.

In a preferred embodiment, because of the intensity increased by the brightening factor for the exposure in the exposure area, the exposure time which would be required in an exposure without use of the brightening factor, is shortened by dividing the exposure time by the brightening factor such that the intensity per exposure element integrated over the exposure time remains the same. In this manner the construction process is speeded up.

Alternatively, in a further preferred embodiment the intensity which would be required for solidifying a layer in an exposure area without use of the brightening factor, can be reduced by reducing the intensity of a light source of the exposure unit by dividing the intensity of the light source by the brightening factor in order to perform the exposure of the exposure area with reduced intensity of the light source.

For an exposure unit including an LED light source and a micromirror device as a spatial light modulator the method according to the present invention is capable of extending service life of the LED light source. This is due to the fact that for homogenizing the intensity of the exposure elements (individual mirrors) not always the entire exposure field of the exposure unit is homogenized but only those exposure elements are taken into account which are associated with picture elements which are inside the actual exposure area for the layer currently to be exposed. For a micromirror device homogenizing involves individual setting of the duty cycles of the individual mirrors. The picture element having, without homogenizing, the lowest effective intensity (the darkest picture element) in the exposure area gets a duty cycle of 100% (always ON during the exposure time). The other picture elements (more precisely the associated exposure elements) get assigned a duty cycle corresponding to the ratio of their brightness compared to the darkest exposure element (for example, an exposure element having 150% of the intensity of the darkest exposure element gets an assigned duty cycle of 66% in order to obtain the same average intensity). By adjusting the energization of the LED light source it can in addition be ensured that either the building process is carried out with constant average intensity, or that the building process is carried out with constant energization of the LED light source with shortened exposure time with maximum processing speed.

If the homogenization would not be carried out locally, specifically for the currently to be exposed exposure area, but globally for the entire exposure field as in the prior art, there would be a maximal variation between the brightest and the darkest exposure element, which variation would have to be compensated. In this case correspondingly more light would have to be deflected into the inactive OFF path, and the amount of "utilized light" would be reduced, i.e. the efficiency would be reduced. For this reason the LED light source would undergo stronger aging per exposure cycle.

In a preferred embodiment, method provisions are made that before performing an exposure of an exposure area an image of the exposure area is transformed, using predetermined transformation matrices, to a pre-distorted image which is utilized for controlling the exposure unit, wherein the predetermined transformation matrices perform a transformation that is inverse to the imaging distortion of the imaging optics of the exposure unit such that the pre-distortion of the image of the exposure area is reversed by the projection of the exposure unit onto the exposure area and is thereby cancelled.

A device for carrying out a method according to the present invention is provided with:

an exposure unit for exposing an exposure area having a contour defined by a control unit, wherein the exposure unit is configured for exposing a plurality of picture elements, which collectively cover a predetermined exposure field, and is arranged to perform an exposure, under the control of the control unit, of an exposure area within the exposure field by selectively exposing picture elements which together define the exposure area with the respectively defined layer contour, wherein the exposure unit is capable of generating for each picture element exposure light with adjustable exposure intensity between zero and a maximal intensity, which exposure light is projected by imaging optics of the exposure unit to the respective picture element, and wherein the control unit is arranged to use data defining an exposure area of a layer to be exposed to control the exposure unit for selectively activating picture elements, which picture elements together define the respective exposure area of a layer to be solidified, and to control the exposure unit by utilizing predetermined homogenizing factors, wherein each picture element is associated with a homogenizing factor which has been predetermined in such a manner that, when for the generation of exposure light an exposure intensity is used which for each picture element is determined by a uniform basic intensity multiplied by the homogenizing factor associated with the respective picture element, the actually effective intensity at a site of exposure is equal for each picture element independent of the position within the exposure field, characterized in that the control unit is further arranged to determine, before each exposure of an exposure area, a brightening factor defined as the ratio between the maximal intensity of the exposure unit to the maximal exposure intensity in the respective exposure area, and to use the exposure intensities multiplied by the brightening factor for exposure of the respective exposure area.

In a preferred embodiment of the device the exposure unit comprises a light source, a spatial light modulator which is located in a beam path of the light source and which is controlled by the control unit, which spatial light modulator includes a two-dimensional array of exposure elements, wherein to each exposure element a respective picture element in the exposure field of the exposure unit is assigned, optical elements between the light source and the spatial light modulator and imaging optics between the spatial light modulator and the exposure area.

In a preferred embodiment the exposure unit is configured to be capable of generating, for each picture element, exposure light with settable exposure intensity between 0 and a maximal intensity by arranging the control unit and the spatial light modulator to cooperate such that the exposure element of the spatial light modulator associated with the respective picture element directs light with intensity 0 for exposure intensity 0, and light with maximal intensity for maximal exposure intensity of the exposure unit to the imaging optics for exposing the respective picture element in the exposure area.

In a preferred embodiment the control unit is further arranged to divide the exposure time that would be required for solidifying a layer in an exposure area without use of the brightening factor.

In a preferred embodiment the control unit is arranged to, when solidifying a layer in an exposure area, to reduce the intensity of the light source of the exposure unit by dividing the intensity required for an exposure without use the brightening factor by the brightening factor, whereas the exposure time is, compared to an exposure without use of the brightening factor, kept unchanged.

In a preferred embodiment the spatial light modulator comprises a micromirror device having a plurality of micromirror actuators arranged in an array, or comprises a liquid crystal display having a plurality of display elements arranged in an array, wherein each micromirror actuator or each display element, respectively, is assigned to a respective picture element in the exposure field.

In a preferred embodiment the light source is an LED light source, wherein light emitted from the LED light source is directed to a light mixing bar which is for example composed of a mirrored outer glass wall structure which is closed in cross-section, wherein light emitted from the LED light source is homogenized by multiple reflections on the inner surface of the mirrored glass wall structure, and light leaving the light mixing bar is directed by imaging optical elements onto a micromirror device, the micromirror actuators of which micromirror device direct light as exposure elements selectively to the associated picture element in the exposure field or to an inactive area, such that in the latter case the picture element associated with the micromirror actuator does not receive light from the associates micromirror actuator.

In a preferred embodiment light emitted by the light mixing bar is directed onto a TIR prism which directs the light beam originating from the LED light source and homogenized in the light mixing bar onto the micromirror device, wherein the control unit is arranged to periodically tilt each micromirror actuator in a clocked manner such that each micromirror actuator transfers light with an exposure intensity between 0 and a maximal exposure intensity according to the duty cycle of each micromirror actuator.

In a preferred embodiment one or more condenser lenses, an aperture and one or more focusing lenses are located in this sequence between the light mixing bar and the TIR prism, such that light from the micromirror device to be directed to the exposure area is directed onto the TIR prism, and after passing the TIR prism passes through a projection lens which projects the micromirror device onto the exposure field.

BRIEF DESCRIPTION OF THE DRAWINGS

The invention will be described in the following with reference to the Figures in which:

FIG. 2 shows a simplified representation of matrices which represent an exposure field having 4×3 picture elements and which illustrate local homogenization in the actual exposure area.

DETAILED DESCRIPTION

Figure 1:
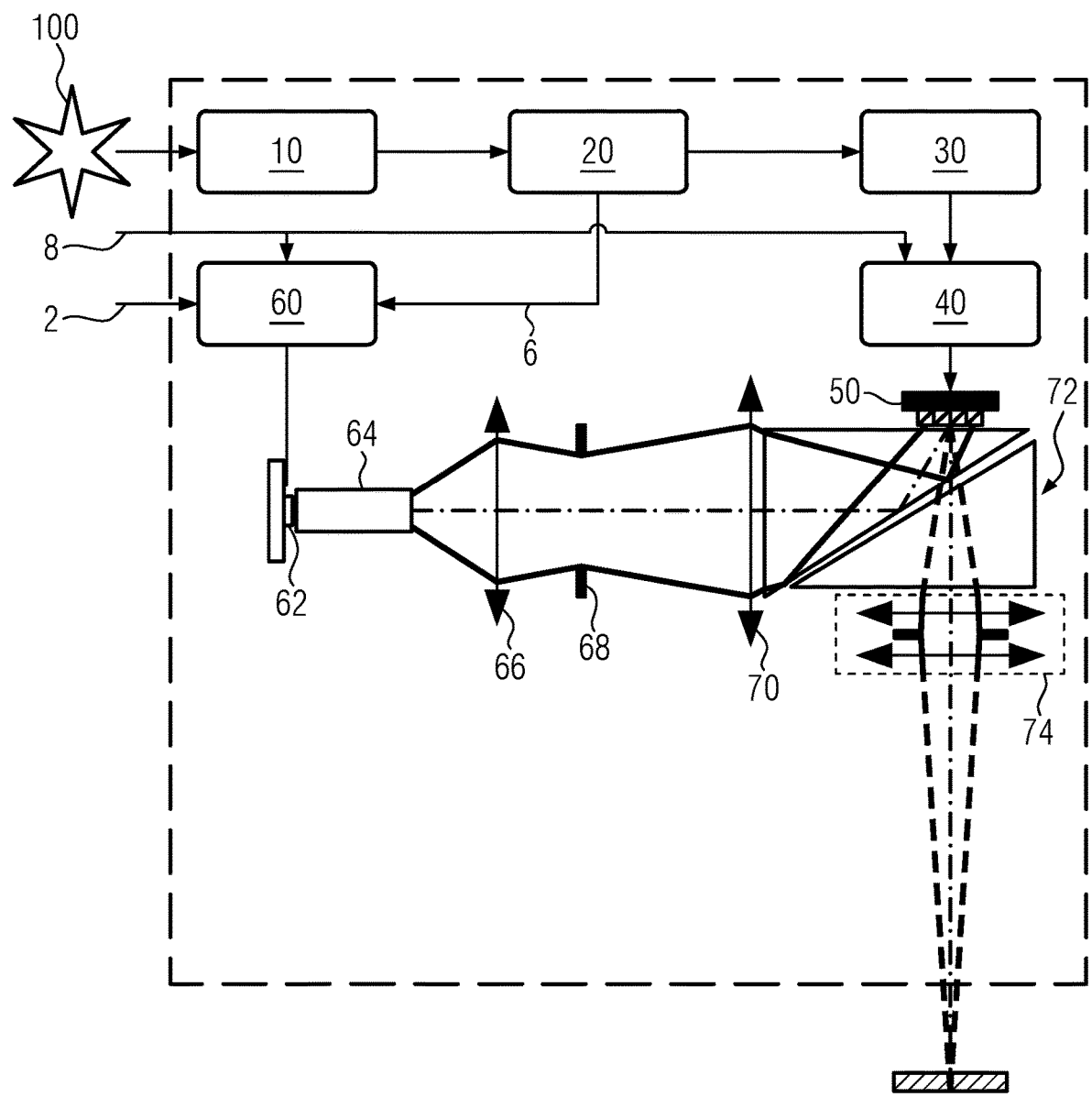
FIG. 1 shows a block diagram illustrating a device that a suitable for carrying out a method according to the invention.

FIG. 1 shows a schematic overview of the exposure unit which is used for the stereolithographic construction method according to the invention, as well as components which are used for controlling the exposure unit for selectively exposing a layer. The components shown in the upper part of FIG. 1 as boxes which are used to control the exposure unit are not necessarily separate data processing units, but can be software modules which serve to carry out the functions described in the following.

In FIG. 1 a contour 100 of a layer to be exposed is symbolically shown as a star. In this connection it has to be noted that a "contour" of a layer to be exposed in the sense of the present invention does not have to be a single continuous area, but may also comprise several separate area portions disposed next to each other. The data model of the layers to be exposed are stored in a memory in advance or are continuously supplied. The data of the layer contour 100 to be exposed can be present in any image data format, for example in PNG data format. The data of the contour 100 of the layer to be exposed are converted in a PNG decoder 10 into a bitmap including in each case 1 bit (black/white) per picture element. The bitmap of the contour 100 of the layer to be exposed is then converted in the homogenizing module 20 such that in the exposure area the originally "white" bits then actually have the same ("white") intensity, and that the originally "black" bits are actually dark, i.e. only have the minimal residual intensity caused by unavoidable scattering of light. To each picture element in the exposure field of the exposure unit a homogenizing factor is assigned which controls the intensity of the associated exposure element such that this exposure element then provides such intensity which after imaging by the imaging optics leads to a homogeneous exposure of the picture elements over the entire exposure field.

Figure 2:
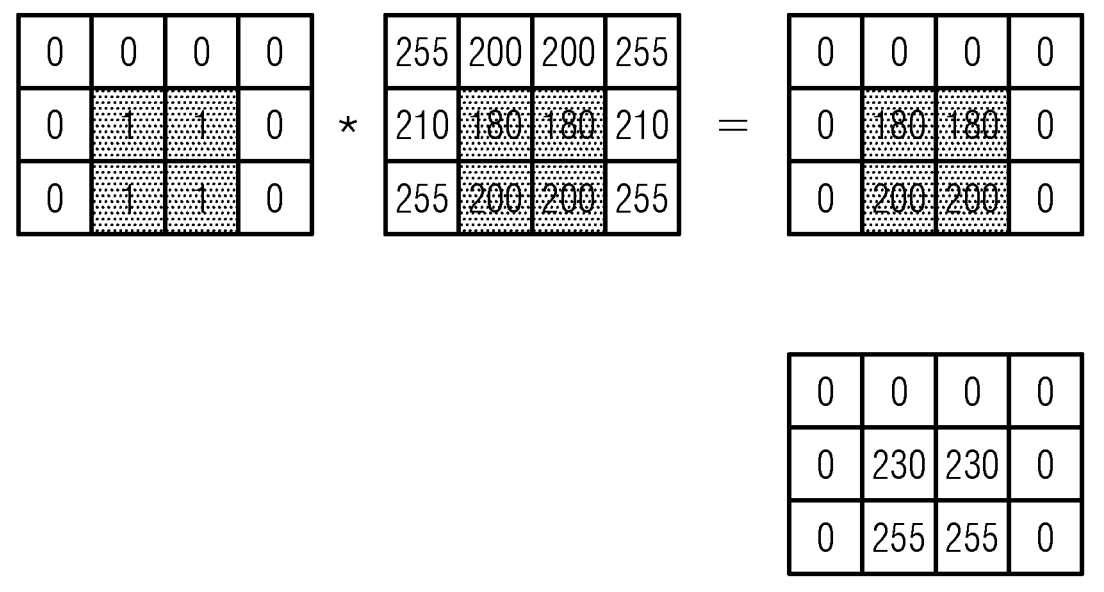

The process of homogenization is illustrated in FIG. 2. FIG. 2 shows a greatly simplified example for an exposure unit having an exposure field of only 4×3 picture elements (exposure units, for example comprising a micromirror device, typically have about $10^6$ picture elements). FIG. 2 shows on the left hand side the bitmap as a 4×3 matrix which is supplied by the PNG decoder 10. The exposure area within the exposure field comprises a square of four picture elements to be exposed which have bit value 1.

In the middle of FIG. 2 a 4×3 matrix of homogenizing factors is shown. In the exposure unit to each picture element of the exposure field an exposure element is assigned which projects light through the imaging optics to the associated picture element. In the example of FIG. 2 it is assumed that each exposure element can be operated with an adjustable intensity on an 8 bit scale, which can be represented by exposure intensities from 0 to 255. Since the imaging optics does not project the exposure intensities homogeneously over the entire exposure field, those picture elements for which the light on the way through the imaging optics is more significantly attenuated have to be supplied with higher average exposure intensities which are inversely proportional to the more significant attenuation in order to achieve a homogeneous exposure intensity over the entire exposure field. In the example of FIG. 2 the picture elements located at the corners receive, if all exposure elements provide the same exposure intensity, the lowest effective exposure intensity. The homogenizing factors are inversely proportional to the effective exposure intensity of a picture element when all exposure elements supply homogeneous exposure intensity over the exposure field. Therefore, the homogenizing factors being assigned to the picture elements in the corners of the exposure field have the highest homogenizing factors of 255 (highest exposure intensity of the associated exposure elements), whereas the two central picture elements have lower homogenizing factors 180.

The matrix on the left hand side representing the quadratic exposure area of 2×2 picture elements is multiplied with the factors of the homogenizing matrix in order to obtain the matrix on the right hand side which forms the basis for controlling the exposure elements which are assigned to the picture elements to be exposed. In the prior art the exposure intensities homogenized in this manner were used for controlling the associated exposure elements. In most cases the exposure area is rather at or close to the center of the exposure field where the homogenizing factors are smaller than at the outer edges of the exposure field. According to the present invention the exposure intensities of the actually to be exposed exposure area are scaled by a common factor in such a manner that at least one exposure element which is assigned to a picture element within the exposure area has the highest possible exposure intensity per exposure element. In the example of FIG. 2 this means that the exposure intensities of the exposure elements in the matrix at the upper right are multiplied with a brightening factor which is defined as the quotient of the maximal exposure intensity possible per exposure element, namely 255, to the maximal exposure intensity of an exposure element present in the actual exposure area, in the example shown 200 (brightening factor=255/200). The resulting matrix of exposure intensities which are used for controlling the exposure elements for exposing the quadratic exposure area of 2×2 picture elements, is shown in the matrix at the lower right in FIG. 2.

After the homogenization has been performed in the homogenizing module the resulting bitmap is supplied as a 8 bit grey value bitmap to a distortion correction module 30. In this module the homogenized image from the homogenizing module 20 is transformed for example by x and y transformation matrices into a pre-distorted coordinate system which has been determined in advance in such a manner that the distortion caused by the imaging optics of the imaging unit is compensated. Exemplary distortion correction methods are described in EP 1 048 441 B1, US 2001/0048184 A1 and U.S. Pat. No. 6,483,596, both U.S. publications of which the contents are hereby incorporated by reference in their entirety.

The grey value bitmap output of the distortion correction module 30 is then transmitted to a DLP controller which controls a spatial light modulator (digital light processor) 50, for example a micromirror device.

In the determination of the homogenizing factors the transformations of the following distortion correction are taken into account such that the combined effect of homogenization and distortion correction results in a homogeneous intensity of the picture elements over the exposure field.

The exposure unit comprises an LED light source 62 which is controlled by an LED driver 60. The intensity of the LED light source can be preset by a superordinate controller which provides a control signal which is indicated by the external line leading to the LED driver 60. Furthermore, there is a connection between the homogenizing module 20 and the LED driver 60 via the line 6. According to an embodiment this allows to reduce the intensity of the LED light source in accordance with the brightening factor (by division by the brightening factor), because by multiplying the exposure intensities by the brightening factor 1), when the exposure time is kept constant, the desired energy dose for each picture element can be achieved using a lower intensity of the LED light source; reduction of the intensity of the LED light source increases its service lifetime.

A line 8 serves to transfer the exposure time to the DLP controller 40. It is possible, but not shown in FIG. 2, that there is also a communication connection between the homogenizing module 20 and the DLP controller 40 (DLP: Digital Light Processor) in order to allow in an embodiment to reduce the exposure time in accordance with the brightening factor to thereby keep the exposure intensities integrated over the exposure time constant.

The light emitted by the LED light source 62 first passes through a hollow light mixing bar 64. This light mixing bar 64 has a closed lateral surface which is formed by a mirrored glass wall structure which, for example, has a rectangular cross-section and which is adapted to the side ratio of the exposure field. The glass wall structure may for example be formed of several mirrored glass plates.

The light mixing bar 64 receives a major portion of the light emitted by the LED light source 62 and homogenizes the light by multiple reflection on the mirrored surfaces along the light mixing bar 64.

The light mixing bar 64 is followed by a condenser lens 66, an aperture 68 and a focusing lens 70. Thereafter the light reaches a TIR prism 72 (TIR: Total Internal Reflection). The TIR prism 72 comprises two prism parts which are separated by a narrow air gap. The TIR prism 72 deflects the exposure beam which before passed the focusing lens 70 onto the spatial light modulator 50 by making use of the internal total reflection on the prism surface facing the narrow air gap. Internal total reflection occurs for all flat incidence angles to the prism surface facing the air gap up to a critical angle. Light reflected by the spatial light modulator 50, for example a micromirror device, passes through the prism surface facing the air gap because the angle of incidence of the reflected light is above the critical angle.

After the TIR prism 72 and the spatial light modulator 50 the exposure beam passes through the imaging objective 74 which projects the active surface of the spatial light modulator 50 onto the exposure field of the exposure unit.

The invention claimed is:

1. A device for carrying out a method for layer-wise construction of a shaped body by stereo lithographic solidification of photopolymerizable material in successive layers comprising:

an exposure unit for exposing an exposure area having a layer contour that is predefined for each layer by a control unit (10, 20, 30, 40), wherein the exposure unit is configured for exposing a plurality of picture elements, which collectively cover a predetermined exposure field, and is configured to perform an exposure, under the control of the control unit, of the exposure area within the exposure field by selectively exposing picture elements which together define the exposure area for each respective layer contour, wherein the exposure unit is configured to generate, for each picture element, exposure light with adjustable exposure intensity between zero and a maximal intensity, which exposure light is projected by projection optics (74) of the exposure unit to an associated picture element, and wherein the control unit (10, 20, 30, 40) is arranged to use data defining the exposure area of a layer to be exposed to control the exposure unit for selectively activating picture elements, which picture elements together define the respective exposure area of a layer to be solidified, and to control the exposure unit by utilizing predetermined homogenizing factors, wherein each picture element is associated with a homogenizing factor which has been predetermined in such a manner that, when for the generation of exposure light an exposure intensity is used which for each picture element is determined by a uniform basic intensity multiplied by the homogenizing factor associated with the each picture element, an exposure intensity at each site of exposure is equal for each picture element independent of the position of each exposure site within the exposure field, wherein the control unit (10, 20, 30, 40) is further arranged to determine, before each exposure of the exposure area, a brightening factor defined as a ratio between the maximal intensity of the exposure unit to a maximal exposure intensity in the respective exposure area, and to use exposure intensities determined by the uniform basic intensity multiplied with the homogenizing factor that is associated with each respective picture element and then multiplied by the brightening factor for exposure of the exposure area, wherein the control unit is further arranged to divide an exposure time that would be required for solidification of a layer in the exposure area without use of the brightening factor by the brightening factor such that a shortened exposure is performed.

2. The device according to claim 1, wherein the exposure unit comprises a light source (62), a spatial light modulator (50) which is located in a beam path of the light source and which is controlled by the control unit, which spatial light modulator includes a two-dimensional array of exposure elements, wherein to each exposure element a picture element in the exposure field of the exposure unit is assigned, optical elements (64, 66, 68, 70, 72) between the light source (62) and the spatial light modulator and the projection optics (74) are between the spatial light modulator and the exposure area, which projection optics project an image of the spatial light modulator (50) onto the exposure field.

3. The device according to claim 2, wherein the exposure unit is configured to be capable of generating, for each picture element, exposure light with adjustable exposure intensity between zero and the maximal intensity by arranging the control unit (10, 20, 30, 40) and the spatial light modulator (50) to cooperate such that the exposure element of the spatial light modulator associated with each respective picture element directs light with intensity zero for exposure intensity zero, and light with the maximal intensity at the maximal exposure intensity of the exposure unit to the projection optics for exposing the associated picture element in the exposure area.

4. The device according to claim 2, wherein the control unit is arranged to, when solidifying the layer in the exposure area, to reduce an intensity of the light source of the exposure unit by dividing an intensity required for an exposure without use of the brightening factor by the brightening factor, while an exposure time is, compared to the exposure without use of the brightening factor, kept unchanged.

5. The device according to claim 2, wherein the spatial light modulator (50) is a micromirror device having a plurality of micromirror actuators arranged in a array, or is a liquid crystal display having a plurality of display elements arranged in an array, wherein each micromirror actuator or each display element, respectively, is associated with a picture element in the exposure field.

6. A device for carrying out a method for layer-wise construction of a shaped body by stereo lithographic solidification of photopolymerizable material in successive layers comprising:

an exposure unit for exposing an exposure area having a layer contour that is predefined for each layer by a control unit (10, 20, 30, 40), a light source (62), a spatial light modulator (50) which is located in a beam path of the light source and which is controlled by the control unit, which spatial light modulator includes a two-dimensional array of exposure elements, wherein to each exposure element a picture element in a predetermined exposure field of the exposure unit is assigned, optical elements (64, 66, 68, 70, 72) between the light source (62) and the spatial light modulator, and projection optics (74) between the spatial light modulator and the exposure area, which projection optics project an image of the spatial light modulator (50) onto the exposure field wherein the exposure unit is configured for exposing a plurality of picture elements, which collectively cover the predetermined exposure field, and is configured to perform an exposure, under the control of the control unit, of the exposure area within the exposure field by selectively exposing picture elements which together define the exposure area for each respectively defined layer contour, wherein the exposure unit is configured to generate, for each picture element, exposure light with adjustable exposure intensity between zero and a maximal intensity, which exposure light is projected by the projection optics (74) of the exposure unit to an associated picture element, and wherein the control unit (10, 20, 30, 40) is arranged to use data defining the exposure area of a layer to be exposed to control the exposure unit for selectively activating picture elements, which picture elements together define the respective exposure area of a layer to be solidified, and to control the exposure unit by utilizing predetermined homogenizing factors, wherein each picture element is associated with a homogenizing factor which has been predetermined in such a manner that, when for the generation of exposure light an exposure intensity is used which for each picture element is determined by a uniform basic intensity multiplied by the homogenizing factor associated with each respective picture element, an exposure intensity at each site of exposure is equal for each picture element independent of the position of each exposure site within the exposure field, wherein the control unit (10, 20, 30, 40) is further arranged to determine, before each exposure of the exposure area, a brightening factor defined as a ratio between the maximal intensity of the exposure unit to a maximal exposure intensity in the respective exposure area, and to use exposure intensities determined by the uniform basic intensity multiplied with the homogenizing factor that is associated with each respective picture element and then multiplied by the brightening factor for exposure of the exposure area, wherein the light source (62) is an LED light source, wherein the LED light source is directed to a light mixing bar (64) which is made up of a mirrored glass wall structure which is closed in cross-section and which forms a light tunnel, wherein light emitted from the LED light source (62) is homogenized by multiple reflections on inner surfaces of the mirrored glass wall structure, and wherein light leaving the light mixing bar (64) is directed by the projection optics (74) onto a micromirror device, micromirror actuators of the micromirror device directing light as exposure elements selectively to each associated picture element in the exposure field or to an inactive area, such that in the latter case the picture element associated with each micromirror actuator does not receive light from the associated micromirror actuator, wherein light emitted by the light mixing bar (64) is directed onto a TIR prism (72) which directs the light beam originating from the LED light source (62) and homogenized in the light mixing bar onto the micromirror device, wherein the control unit is arranged to periodically tilt each micromirror actuator in a clocked manner such that each micromirror actuator transfers light with an exposure intensity between zero and the maximal exposure intensity according to a duty cycle of periodic tilting of each micromirror actuator.

7. The device according to claim 6, wherein between the light mixing bar (64) and the TIR prism (72) one or more condenser lenses, an aperture (68) and one or more focusing lenses (70) are located in a sequence, and wherein light which is to be projected to the exposure area is directed onto the TIR prism (72), and after passing the TIR prism, passes through a projection lens which projects the micromirror device onto the exposure field.

* * * * *